United States Patent [19]

Elmore et al.

[11] 4,091,142
[45] May 23, 1978

[54] STRUCTURAL PANEL AND METHOD OF MAKING SAME

[75] Inventors: Richard R. Elmore; Benjamin M. Couch, both of Herrin, Ill.

[73] Assignee: Dura-Plex Industries, Inc., Herrin, Ill.

[21] Appl. No.: 650,941

[22] Filed: Jan. 21, 1976

Related U.S. Application Data

[60] Continuation of Ser. No. 463,275, Apr. 23, 1974, abandoned, which is a division of Ser. No. 218,398, Jan. 17, 1972, Pat. No. 3,846,524.

[51] Int. Cl.² .......................... B32B 5/20; B32B 5/24; B32B 5/16; B32B 27/40
[52] U.S. Cl. ...................................... 428/322; 156/78; 264/45.3; 428/297; 428/425
[58] Field of Search .................. 428/86, 310, 322, 423, 428/96, 425, 315, 90, 297; 264/45.3, 46.7, 46.5; 156/78

[56] References Cited

U.S. PATENT DOCUMENTS

| | | | |
|---|---|---|---|
| 2,948,651 | 8/1960 | Waag | 428/86 |
| 3,274,046 | 9/1966 | Shannon et al. | 428/86 |
| 3,282,761 | 11/1966 | Evangelist | 428/116 X |
| 3,311,527 | 3/1967 | Urbanic et al. | 428/90 |
| 3,389,196 | 6/1968 | Stahl | 264/46.5 |
| 3,391,823 | 7/1968 | Tijms | 428/35 X |
| 3,511,738 | 5/1970 | McGuire | 428/71 |
| 3,591,444 | 7/1971 | Hoppe | 428/86 |
| 3,616,171 | 10/1971 | Hoskinson | 428/310 X |
| 3,626,044 | 12/1971 | Arnaud | 264/46.5 |
| 3,627,603 | 12/1971 | Greig | 428/425 |
| 3,637,459 | 1/1972 | Parish et al. | 428/315 |
| 3,674,611 | 7/1972 | Petry et al. | 428/90 X |
| 3,816,234 | 6/1974 | Winfield | 428/306 |
| 3,959,541 | 5/1976 | King et al. | 428/310 X |

*Primary Examiner*—Harold Ansher
*Attorney, Agent, or Firm*—Emrich, Root, O'Keeffe & Lee

[57] ABSTRACT

A structural panel for use in building construction and the like wherein side skin sheets of fiber-reinforced polyester are spaced to form a mold cavity to receive a foamable resin composition which, upon curing, is integrally secured to the skin sheets so as to prevent delamination of the skin sheets from the core. The methods of making the side skin sheets and introducing the foamable core composition therebetween provide a structural panel of high strength and durability independent of the size of the panel, with increased core integrity over panels heretofore available.

11 Claims, 13 Drawing Figures

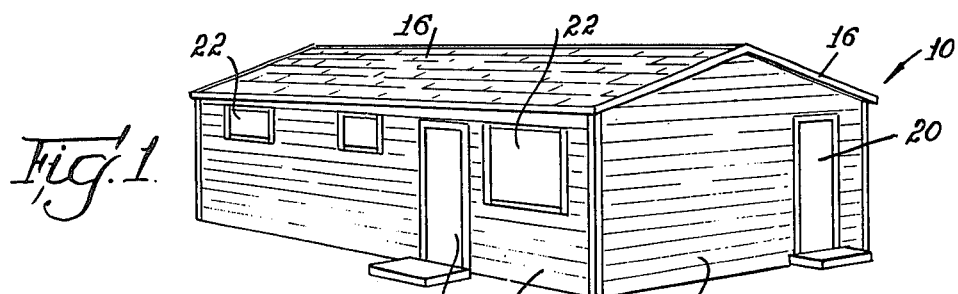
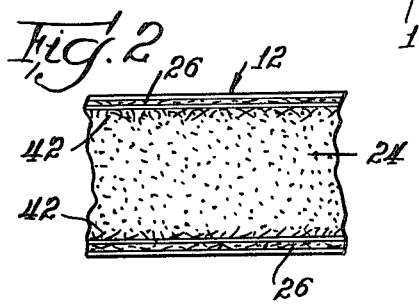
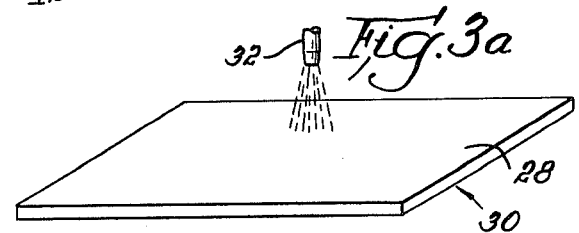
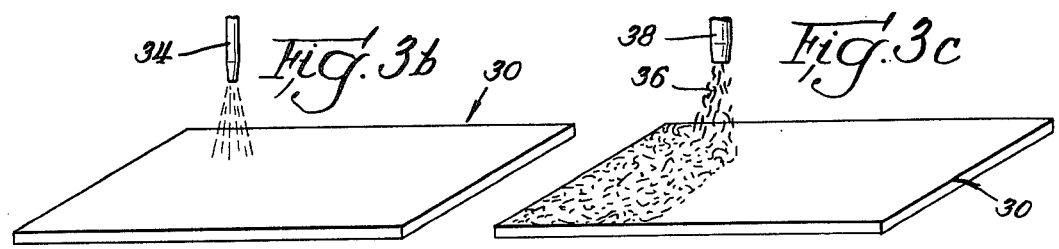
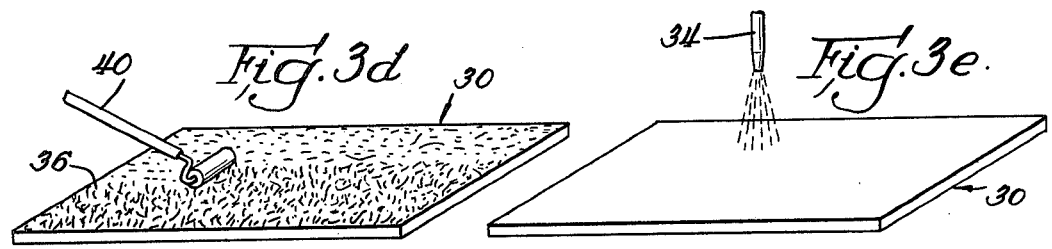
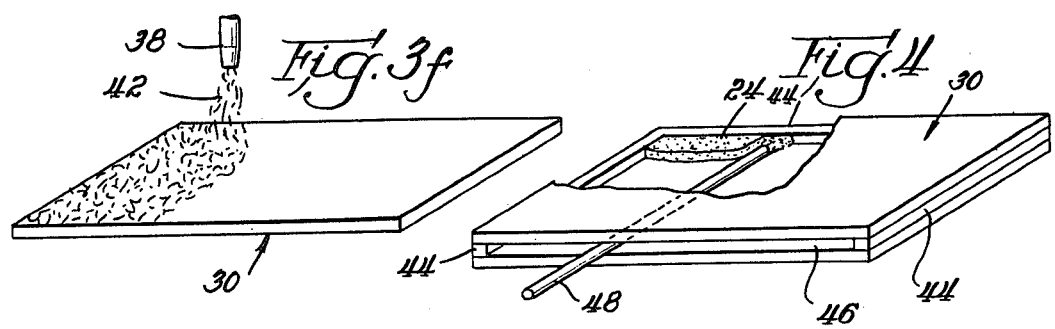

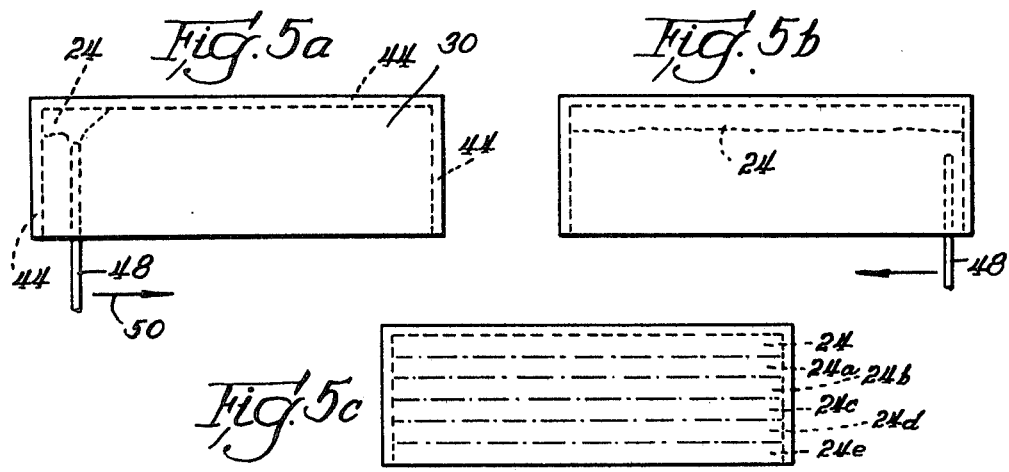
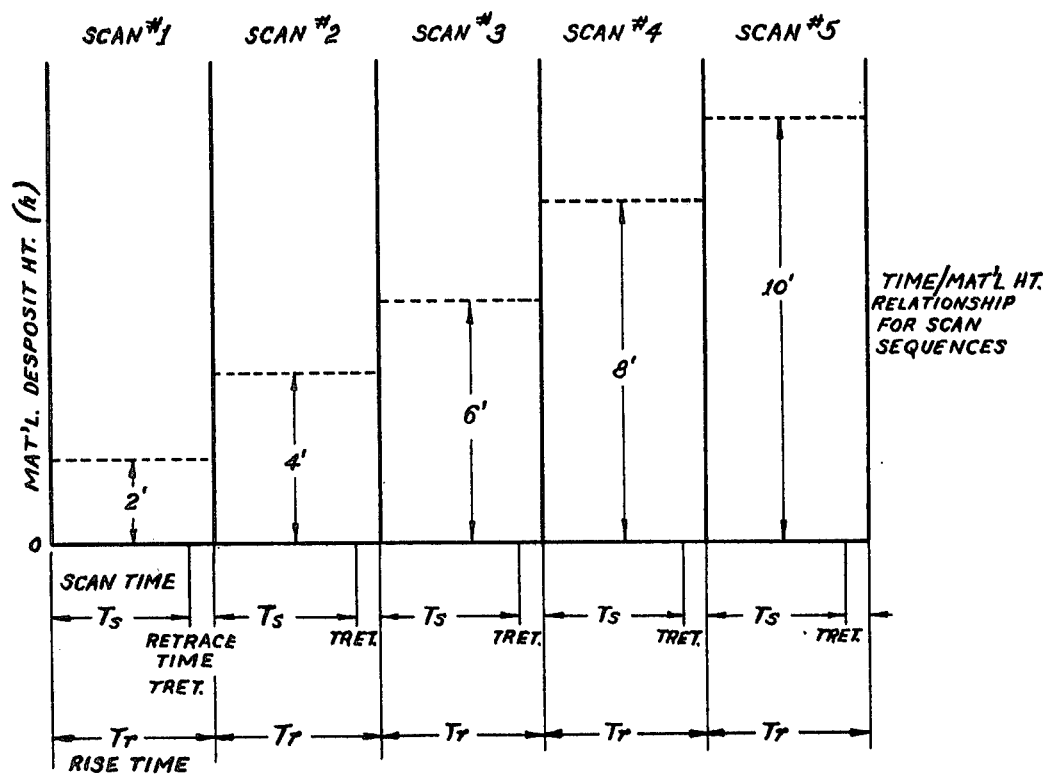

STRUCTURAL PANEL AND METHOD OF MAKING SAME

This is a continuation, of application Ser. No. 463,275, filed Apr. 23, 1974, which is a division of application Ser. No. 218,398, filed Jan. 17, 1972, now U.S. Pat. No. 3,846,524.

BACKGROUND OF THE INVENTION:

The present invention relates generally to structural panels, and more particularly to a novel high strength structural panel and method of making the same which provides a novel building construction element.

The building industry, and particularly the housing segment of the building industry, has long been concerned with low-cost construction techniques which lend themselves to both relatively high rates of production and low construction costs. The emphasis on low-cost housing has increased as a normal result of increased population growth, the establishment of retirement communities, and the increase in leisure time and greater demand for second homes. Recent trends in housing construction have introduced the concept of mass-produced homes to eliminate many of the conventional on-site constructional techniques which contribute to high building costs. The mass-produced housing concept utilizes pre-fabricated structural components, such as walls and roof sections, which are transported to the building site and assembled to form a housing unit. In order to accomplish satisfactory housing units at relatively low cost, the pre-fabricated structural components must be economical to manufacture, of high integrity and durability, and must lend themselves to ease of assembly with other structural components.

Various methods have been tried in an attempt to provide panels of foamable resin material which are of a size sufficient to permit building of houses therefrom and have the necessary structural integrity. The known techniques for producing structural panels have, in the majority, failed to provide structural panels which have uniform core density and are devoid of air pockets or bubbles within the core which tend to substantially weaken the structural panels. In one approach to the manufacture of structural panels, a foamable resin core material is introduced into a generally horizontally disposed open form or mold and allowed to rise during expansion and curing. The cured core is then removed from the mold and cut or sliced to provide panel slabs of desired thickness. The cut core slabs are then provided with polyester skins which are glued to the outer surfaces of the cores to provide the finished slab. This approach is relatively costly and does not preclude delamination of the side skins from the core body. The present invention overcomes the disadvantages in the prior art methods of structural panel construction by providing a structural panel and method for making the same which results in a uniform density high strength core integrally secured to side skin sheets, the panel being particularly effective for use in low-cost housing construction.

SUMMARY OF THE INVENTION

One of the primary objects of the present invention is to provide a novel structural panel for use in building structures and the like, which panel exhibits greater integrity and durability than the structural panels heretofore available.

Another object of the present invention is to provide a novel method for producing high strength structural panels for use in building structures and the like.

Another object of the present invention is to provide a novel method for producing high strength structural panels wherein a foamed resin composition core is disposed between fiber-reinforced side skin sheets in a manner to effect optimum surface adhesion of the core to the skin surfaces and thereby substantially eliminate delamination of the side skins from the core.

Another object of the present invention is to provide a method of making structural panels wherein a foamable resin composition core is formed between fiber-reinforced side skin sheets in sandwich fashion by novel steps which prevent the creation of pour lines and voids within the core and thereby maximize core integrity and strength.

Another object of the present invention is to provide a high strength structural panel for use in building constructions and the like, which panel is highly durable and substantially more economical than has heretofore been available.

Another object of the present invention is to provide a novel method of making fiber-reinforced side skin sheets for use with a foamable resin composition core wherein the skins have maximum fiber surface area for adhesion to the foamable core material to prevent delamination of the skins from the core.

Another object of the present invention is to provide a novel method for making a structural panel having a core of foamed polyurethane or the like, wherein the method produces a core of uniform density and high integrity independent of the size of the panel to be produced.

In carrying out the objects and advantages of the present invention there is provided a structural panel having, in a preferred embodiment, a core section made of a foamable resin composition such as polyurethane foam. Side skin surfaces made of fiber-reinforced polyester are disposed on either side surface of the structural panel, each of the side skin sheets forming a side portion of a mold cavity into which the foamable core material is introduced during manufacture of the structural panel. Each of the side skin sheets has a layer of fiber roving adjacent the core such that the individual fibers provide increased surface area for adhesion to the foamable core material.

In manufacturing structural panels in accordance with the present invention, the side skins are first made and are supported with their fiber roving surfaces in opposed parallel spaced relation. The foamable resin core composition is then introduced into the mold cavity defined between the side skins by means of a deposit probe. The core material deposit probe is caused to scan the width of the mold cavity to deposit foam at a predetermined rate, successive scans of the deposit probe being effected at a rate to establish cross linking between successive deposits of the foamable core material and to prevent the establishment of voids and pour lines in the resulting panel.

Further objects and advantages of the present invention, together with the organization and manner of operation thereof, will become apparent from the following detailed description of a preferred embodiment of the present invention when taken in conjunction with the accompanying drawings wherein like reference numerals designate like parts throughout the several views.

BRIEF DESCRIPTION OF THE DRAWINGS

FIG. 1 is a perspective view of a modular housing construction in accordance with the present invention;

FIG. 2 is an enlarged partial edge view taken through a structural panel in accordance with the present invention to illustrate the side skin sheets and core disposed therebetween;

FIGS. 3a–3f schematically illustrate steps in the method of making side skin sheets for structural panels in accordance with the present invention;

FIG. 4 is a perspective view schematically illustrating two mold halves secured in spaced relation to define a mold cavity for the introduction of foamable core material therebetween, a portion of the upper mold half being broken away to better illustrate the core material depositing probe;

FIGS. 5a–5c schematically illustrate the steps in the method of introducing foamable core material between the positioned outer side skin sheets in accordance with the present invention;

FIG. 6 graphically illustrates the manner of depositing core material into the mold cavity of FIG. 4 in accordance with the present invention;

DESCRIPTION OF A PREFERRED EMBODIMENT

Referring now to the drawings, and in particular to FIG. 1, a housing unit or structure constructed in accordance with the present invention is indicated generally at 10. The housing unit 10 is constructed in accordance with what are generally termed "pre-fabricated" building techniques, and includes, in the illustrated embodiment, four generally vertically disposed outer walls which support roof sections to define an enclosed housing unit having a generally rectangular plan interior area. The outer walls of the housing unit 10 comprise front and rear walls, the front wall being shown at 12, and end walls, one of which is shown at 14. The roof sections are indicated at 16, there being two inclined roof sections defining a roof peak as shown. The front wall 12 is illustrated as having a door 18 providing access to the interior of the house, while the end wall 14 similarly has a door 20. Any number of windows, such as shown at 22, may be provided in the wall structural panels as desired to accomplish suitable natural lighting consistent with the overall size of the housing unit constructed.

The present invention is directed to the structural panels which comprise the walls and roof sections of the unit 10, and the method of manufacturing the panels in place for subsequent transportation to a building site for assembly into the building unit. FIG. 2 illustrates an end view of the structural panel comprising the front wall 12 and is representative of the structural panel construction in accordance with the present invention. As there shown, the panel includes a core or main body portion 24 which, in the final structural panel, comprises a cured polyurethane foam or any other suitable cured foamable resin composition. The core 24 has side skin sheets 26 integrally secured to the opposite side surfaces thereof. The skin sheets 26 are made of fiber-reinforced polyester (FRP), commonly known as fiberglass, in a manner to present substantially more area of adhesion to the center core material 24 than has heretofore been practiced in structural panels, and thus substantially eliminates problems of side skin sheet delamination as prevalent in the prior art.

A typical structural panel in accordance with the present invention and the method of making the same may best be understood by reference to FIGS. 3a–3f, 4 and 5a–5c which sequentially illustrate the steps in the method of making the skin sheets and the composite structural panel. With particular reference to FIG. 3a, the first step in making a structural panel in accordance with the present invention is to form the side skin sheets which are then supported in substantially parallel spaced relation to form a mold cavity for the introduction of foamable core material. A coat of polyester known as gel coat is first applied to the surface or mold face 28 of a mold, indicated generally at 30, having a plan area substantially equal to the area of the structural panel being made. The mold face 28 which establishes the outer configuration of the finished panel may have a surface pattern therein simulating drop-siding, wood shingles, or plaster. The gel coat is uniformly applied onto the mold surface 28 through a suitable spray nozzle 32 to provide a uniform layer or thickness of gel coat of approximately 0.015 inch thickness. The first layer of gel coat serves to give a satin texture to the finished skin sheet. After the gel coating has been applied, a layer of polyester resin is deposited directly onto the gel coat layer, as indicated in FIG. 3b, through a spray nozzle 34 to provide a resin layer of uniform thickness. Next, a layer of chopped glass strands or fiberglass roving 36 is applied to the first layer of resin, before it cures, through suitable means such as a discharge nozzle 38 as shown in FIG. 3c. After depositing the fiberglass roving onto the first layer of polyester resin, the fibers are forced into the first layer of resin by suitable means such as a roller device 40 to insure that the fibers become completely impregnated with the polyester resin and to provide the reinforcing characteristics of the laminate. Rolling the fiber strands into the polyester resin coating also serves to force all air out of the composite laminate and prevent the creation of potential weak spots in the skin sheet.

After the first layer of chopped glass roving has been forced into the first layer of polyester resin, a second layer of polyester resin is applied onto the resin-fiber laminate through the spray nozzle 34 as shown in FIG. 3e, the second layer of polyester resin being applied before curing of the first layer so as to insure cross-linking between the first and second layers of resin. Thereafter, a second layer of chopped fiberglass roving 42 is applied to the second layer of resin by the discharge nozzle 38 prior to curing of the second resin layer. The second layer of glass fibers 42 is not, however, rolled or otherwise forced into the second layer of resin. Rather, fiber end portions of the second layer of fibers 42 are allowed to partially project outwardly from the second layer of resin, but with each of the fibers being at least partially integrally embedded into the second layer of resin. The resin and fiberglass roving layer are then allowed to cure. In this fashion, the ends of the individual fibers 42 projecting outwardly from the second layer of resin will provide substantially greater adhesion area for the foamed core to be associated therewith as will become more apparent hereinbelow.

As noted, two skin sheets 26 comprise the inner and outer surfaces of each of the structural panels such as indicated at 12 in FIG. 2. After making two skin sheets in accordance with the method above-described, two molds 30 with skin sheets 26 therein are supported in parallel spaced relation with the outwardly projecting fibers 42 in opposed relation as shown schematically in FIG. 4. The two molds 30 are maintained in spaced relation by closure spacers 44 provided along three marginal edge portions of the rectangularly shaped molds 30 to leave an opening 46 across one edge portion providing access to the mold cavity defined between the spaced molds. While the molds 30 are herein illustrated and described as being rectangular in plan configuration, it will be appreciated that the molds may be of substantially any desired plan configuration with the mold cavity defined therebetween being closed by suitable spacer means except along one edge portion of the mold assembly, preferably along a major dimension of the mold cavity. The mold halves 30 and the associated spacers 44 may be secured together through any suitable means which allow release of the mold halves 30 and removal of the spacers 44 upon completion of a structural panel. Suitable means (not shown) are employed to reinforce the mold sections when in assembled relation so that the mold section will not bow or otherwise deform during curing of the core material which may create pressures against the mold sections approaching 1000 p.s.ft.

With the mold halves 30 and their associated skin sheets 26 secured in spaced relation, a core material deposit means comprising an elongated tubular material depositing probe 48 is inserted into the opening 46 such that the discharge end of the probe 48 is disposed adjacent to furthest portion of the cavity from the opening 46. For example, with a rectangular mold cavity as illustrated in FIG. 4, the elongated probe 48 is inserted such that its discharge end is adjacent either of the far corners of the mold cavity. Prior to depositing the foamable core material into the mold cavity between the spaced skin sheets, tubular conduits for electrical wiring or plumbing systems may be inserted into the cavity and suitably retained in fixed relative position therein for subsequent use in the housing unit constructed with the structural panels in accordance with the present invention.

The core material discharge probe 48 is connected to a conventional source of polyurethane foam (not shown) which is selectively operable to introduce a foamable resin composition into the elongated probe 48 and effect discharge thereof from the outer end of the probe in accordance with predetermined rates of deposit. Upon inserting the elongated probe 48 into the mold cavity between the spaced skin sheets as shown in FIG. 4, the foamable resin composition is discharged from the probe 48 into the mold cavity and the probe is caused to move in a scanning direction across the mold cavity generally transverse to the longitudinal axis of the discharge probe 48. The foamable resin composition is deposited into the mold cavity at a predetermined rate which is a function of the flow passage size in the probe 48 and the rate at which the probe is caused to scan or move across the mold cavity, considered in the scan direction. With reference to FIG. 5a, the discharge probe 48 is caused to move in a direction indicated by arrow 50 from the left-hand edge of the mold cavity to the right-hand edge thereof leaving a uniform deposit of resinous core material 24 deposited within the mold cavity as indicated in FIG. 5b.

When the discharge probe 48 reaches the opposite edge of the mold cavity from which it initially began, it is selectively retracted in an axial direction outwardly from the bottom of the mold cavity and returned in a retrace direction to the left-hand edge of the mold cavity preparatory to a subsequent scan. During the retrace movement of the probe 48, the supply of resinous core material to the probe is shut off so as not to be introduced into the mold cavity. The rate of movement of the deposit probe during retracing to its initial starting position following a deposit scan movement is established such that the previous deposit of foamable resin core composition will have reached a predetermined rise but will not have cured, thus insuring that the next layer of foamable core material to be deposited will crosss-link with the prior resin deposit. The rise of each successive deposit of resinous core material is allowed to substantially reach its maximum limit before applying another layer to prevent continued expansion of the prior deposit which might create excessive compaction of the deposited core material and excesssive pressure against the skin sheets (at the strain point which occurs after the rise time, or expansion, is terminated and at which time the material is still hot and sufficiently soft to effect the desired cross-linking). It is important that each scan or deposit of the foamable core material be made prior to curing of the previous deposit so that integral cross-linking is effected between successive deposits, and pour lines are prevented which would substantially reduce core integrity and weaken the structural strength of the resulting panel.

FIG. 5c schematically illustrates a plurality of scan passes of the deposit probe 48 to establish successive deposits 24, 24a, 24b, 24c, 24d and 24e, each successive scan or deposit of foamable core material being effected prior to curing of the next preceding deposit. It is important that the amount of material discharged from the deposit probe, considered in pounds per minute, and the rate at which the probe is moved during its scanning movement, considered in feet per minute, be selected to effect cross-linking between successive deposits of the foamable core material. In accordance with the present invention, the deposit of the foamable core material is effected in a manner to obtain a core 24 between the skin sheets 26 of uniform density and high integrity independent upon the size of the structural panel being produced. The scan rate and the deposit delivery rate may vary depending upon the density of the foamable core material employed. After pouring the last scan deposit of foamable core material, a plate (not shown) or other suitable means is secured on the upper open edge of the mold cavity to close the same so that the core material is allowed to expand against the plate to effect an even edge surface of the core with the associated skin sheets.

It has been found that using a two pound foam at a deposit rate and scan rate such that the expanded foamable core material will rise to a height of about 2 feet, considered with the mold cavity generally vertically disposed, or will expand about 2 feet in a horizontal direction, considered with the mold cavity in a generally horizontal position as indicated in FIGS. 4 and 5a–5c, will result in a satisfactory panel core of high integrity. Introduction of the foamable core material at a higher rate tends to cause excessive pressures within the mold cavity resulting in compactions and undesirable air entrapments resulting in voids which are detrimental to the integrity of the resulting structural panel. On the other hand, introducing the foamable core material at lower rates reduces the efficiency with which the structural panels may be produced and increases the number of scans necessary to accomplish filling of the mold cavity.

It has been found that a delivery rate for the foamable core material in accordance with the relationship Mr=htSD/Tr-Tret provides a highly desirable core integrity; where "t" is the thickness of the cavity to be filled, "S" is the length of a scan or the length of the cavity, "D" is the density of the chosen foamable core material after expansion, "Tr" is the rise time for the particular foam material selected, "Tret" is the time required to retract the probe and retrace it to its starting edge of the cavity, and "h" is the desired height of expansion of the particular deposit of foamable core material which is preferably selected to equal 2 feet. With a material deposit rte in accordance with the foregoing equation, the scan rate (Sr) or speed at which the probe should be caused to traverse across the width of the mold cavity is selected in accordance with the equation Sr=S/Tr-Tret. FIG. 6 graphically illustrates the various parameters comprising the above equations for core material delivery rate and deposit probe scan rate, where $T_s$ represents the time required for one scan of the deposit probe.

In accordance with one example of the present invention, a mold cavity having a 2 ¾ inch thickness, a 12 foot depth, and a 24 foot width was filled with a foamable core material (such as a polyurethane of the type commercially available from M & R Plastics, St. Louis, Missouri under the tradename Mistaform and identified by manufacturer's serial numbers 850-S/801-H) having a rise time (Tr) of 190 seconds. With the probe retrace time (Tret) being selected at 15 seconds, the delivery rate in accordance with the above equation would be approximately about 7.5 pounds per minute. The foam material depositing equipment should than be adjusted to supply material at this rate, and the probe scan rate (Sr) determined in accordance with the above equation would be approximately 8.2 feet per minute, the time required to fill the mold cavity having the aforenoted dimensional configuration being approximately 17.6 minutes. If a larger mold cavity is selected, it would be necessary to increase the transverse scan speed of the probe and to vary the core material delivery rate. For example, if the size of the mold cavity were increased in thickness, i.e., the distance between the spaced skin sheets in the molds 30, the delivery rate would be increased by either employing a single deposit probe having a greater core material delivery rate, or employing deposit means comprising a plurality of deposit probes to introduce the required additional core material in essentially the same period of time as given for the above example. In any event, the deposit rate should be limited so as not to result in an expanded foam depth of greater than 2 feet per scan of the deposit probe.

It has been found that the method of introducing the foamable core material as above described results in elimination of pour lines and substantially increases the adhesive characteristics of the core material to the skin sheets whereby to prevent delamination of the core material from the skin sheets after the completed structural panel is removed from the mold 30. It has also been found that structural panels made in accordance with the aforedescribed method provide substantial economic advances over the methods heretofore employed through maximum utilization of the machinery associated with the deposit probes to effect core material deposit and scanning of the probes.

In addition to the high integrity offered by the structural panels in accordance with the present invention, cracking and warping of the panels is resisted. Additionally, the structural panels are impervious to termites, rodents, fungi, acid and other pollutants. Exterior colors for the structural panels may be impregnated into the skin sheets thereby eliminating the need for continued maintenance, although painting of the panels may be readily accomplished if desired. It has been found that housing constructions employing the structural panels in accordance with the present invention provide substantial economic savings over conventional housing constructions thereby making the described modular housing units particularly desirable for low-cost housing with a minimum of maintenance expense.

While a preferred embodiment of a structural panel in accordance with the present invention, and a preferred method of making the structural panels, have been illustrated and described, it will be understood that changes and modifications may be made therein without departing from the invention in its broader aspects.

We claim:

1. A structural panel for use in building construction and the like, comprising a core of cured foamed resin composition having a configuration corresponding substantially to the desired shape of the structural panel and including side surfaces, and a side skin sheet integrally secured to each side surface of said core, at least one of said side skin sheets being made of a cured fiber-reinforced resin including a first layer of resin which has reinforcing material to provide increased strength for the sheet, and a second layer of resin on said first layer having a plurality of fibers with portions thereof embedded in said second layer and other portions of the fibers projecting from a surface thereof into and integrally adhering with said foamed core.

2. A structural panel as defined in claim 1 wherein said core is comprised of cured thermosetting foamed polyurethane.

3. A structural stress skin panel for use in building construction, comprising a core of cured foamed thermosetting resin composition having a configuration corresponding substantially to the desired shape of the structural panel and including side surfaces, and a first side skin sheet and a second side skin sheet integrally secured respectively to a pair of opposite side surfaces of said core, at least one of said side skin sheets comprising a cured fiber-reinforced polyester body including a first layer of thermosetting resin which has fiberglass material integral therewith to provide increased strength for the sheet, and a second layer of thermosetting resin on said first layer including a plurality of fibers having portions thereof embedded in said second layer and other portions of the fibers projecting from the second layer and into the foamed core and integrally adhering to the interior of said foamed core to provide an interface between the core and the first layer which provides increased vertical columnar strength.

4. A structural stress skin panel for use in building construction and the like, comprising a core of cured foamed resin composition having a configuration corresponding substantially to the desired shape of the structural panel and including at least one side skin sheet integrally secured to one side surface of said core comprising a first and a second layer of cured fiber-reinforced polyester resin, each of which layers has fiberglass material integral therewith to provide increased strength for the sheet, the second layer having a plurality of fiberglass fibers having portions embedded in said polyester resin layer and other portions of the fibers projecting into the core and integrally adhering to the foam within said core.

5. A structural stress skin panel for use in building construction, comprising a core of cured foamed thermosetting resin composition having a configuration corresponding substantially to the desired shape of the structural panel and including side surfaces, and a first and a second side skin sheet integrally secured respectively to a pair of opposite side surfaces of said core, at least one of said side skin sheets comprising a cured fiber-reinforced polyester body including a first layer of thermosetting resin which has fiberglass fibers integral therewith to provide increased strength for the sheet, and a second layer of thermosetting resin polymerized with said first layer including a further plurality of fibers having portions thereof embedded in said second layer and some portion of the resin stiffened fibers projecting into the first layer and other portions of the resin stiffened fibers projecting from the second layer and into the foamed core and integrally adhering to the interior of said foamed core to provide an interface between the core and the first layer which provides increased resistance to separation of the skin from the core and thereby increased strength.

6. A structural stress skin panel for use in building construction and the like, comprising a core of cured foamed resin composition having a configuration corresponding substantially to the desired shape of the structural panel and including at least one side skin sheet integrally secured to one side surface of said core, comprising a first layer of a cured fiber-reinforced polyester resin, and a second layer of polyester resin polymerized with said first layer, each of which layers has fiberglass fibers integral therewith to provide increased strength for the sheet, a plurality of resin stiffened fiberglass fibers embedded in said second polyester resin layer having certain portions which project into the first layer and other portions which project into the core and integrally adhere to the foam within said core to provide an interface between the core and the skin of increased strength.

7. A laminated sandwich panel comprising: a first outer laminate resin layer; a first inner layer bonded at an outer surface thereof to said outer laminate resin layer, said first inner layer comprising a mixture of resin and a sufficient quantity of chopped fibers per unit area of said first inner layer to form a fibrillar surface of a multiplicity of said fibers extending from the inner surface of said first inner layer; and a layer of foamed synthetic resin bonded on one surface to said first inner layer with said extending fibers of said first inner layer interlocking with said layer of foamed synthetic resin.

8. A panel as claimed in claim 7, further comprising: a second outer laminate resin layer; a second inner layer identical to said first inner layer and bonded to the other surface of said layer of foamed synthetic resin and to said second outer laminate resin layer, with the extending fibers of said second inner layer interlocking with said layer of foamed synthetic resin.

9. A panel as claimed in claim 7 wherein said chopped fibers consist of fiberglass.

10. A panel as claimed in claim 7, wherein the outer surface of said first outer laminate resin layer additionally is provided with a gel coat.

11. A panel as claimed in claim 7, wherein said foamed synthetic resin is a rigid polyurethane foam having a density of approximately 2 pounds per cubic foot.

* * * * *